(12) United States Patent
Du et al.

(10) Patent No.: US 7,806,670 B2
(45) Date of Patent: *Oct. 5, 2010

(54) PROTECTOR FOR ELECTRICAL SUBMERSIBLE PUMPS

(75) Inventors: Michael H. Du, Pearland, TX (US); Lawrence C. Lee, Pearland, TX (US); Arunkumar Arumugam, Pearland, TX (US); Ashley C. Kishino, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 459 days.

This patent is subject to a terminal disclaimer.

(21) Appl. No.: 11/733,511

(22) Filed: Apr. 10, 2007

(65) Prior Publication Data

US 2007/0207046 A1 Sep. 6, 2007

Related U.S. Application Data

(60) Continuation of application No. 10/907,976, filed on Apr. 22, 2005, now Pat. No. 7,217,107, which is a continuation of application No. 10/727,922, filed on Dec. 4, 2003, now Pat. No. 6,981,853, which is a division of application No. 10/059,795, filed on Jan. 29, 2002, now Pat. No. 6,688,860.

(60) Provisional application No. 60/303,860, filed on Jul. 9, 2001, provisional application No. 60/299,013, filed on Jun. 18, 2001.

(51) Int. Cl.
*F04B 17/03* (2006.01)
*H02K 5/10* (2006.01)
(52) U.S. Cl. .................................. 417/414; 310/87
(58) Field of Classification Search ................ 417/414; 310/87

See application file for complete search history.

(56) References Cited

U.S. PATENT DOCUMENTS

| | | | | | |
|---|---|---|---|---|---|
| 3,475,634 | A | * | 10/1969 | Bagdanov et al. | 310/87 |
| 3,947,709 | A | * | 3/1976 | Waltman | 310/87 |
| 4,940,911 | A | * | 7/1990 | Wilson | 310/87 |
| 6,059,539 | A | * | 5/2000 | Nyilas et al. | 417/228 |
| 6,242,829 | B1 | * | 6/2001 | Scarsdale | 310/87 |
| 6,268,672 | B1 | * | 7/2001 | Straub et al. | 310/87 |
| 6,688,860 | B2 | * | 2/2004 | Du et al. | 417/423.11 |
| 6,981,853 | B2 | * | 1/2006 | Du et al. | 417/414 |
| 7,217,107 | B2 | * | 5/2007 | Du et al. | 417/414 |

* cited by examiner

*Primary Examiner*—Charles G Freay
(74) *Attorney, Agent, or Firm*—Van Someren, PC; Rodney V. Wafford; Kevin B. McGoff

(57) ABSTRACT

A system and method is used to protect a motor of a submersible pumping system. A variety of motor protector features are provided to facilitate operation of the motor protector and submersible pumping system in multiple wellbore environments and applications.

14 Claims, 11 Drawing Sheets

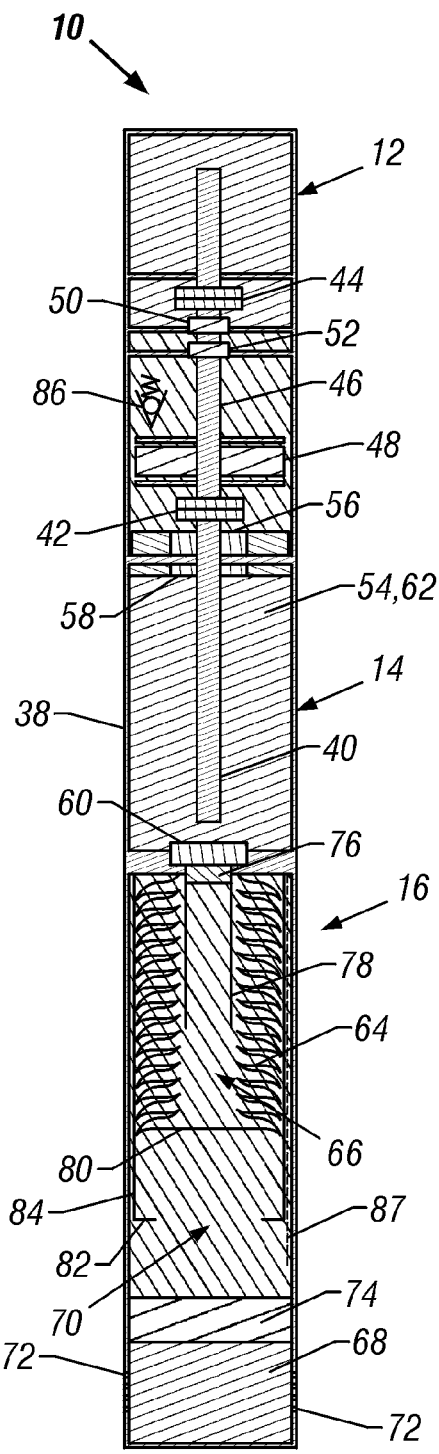
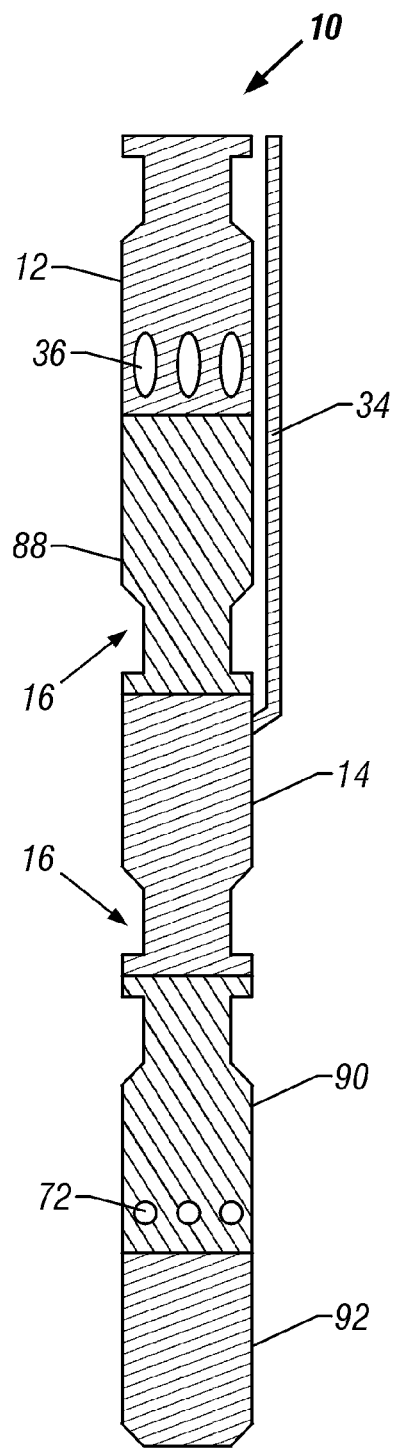
FIG. 2
FIG. 3

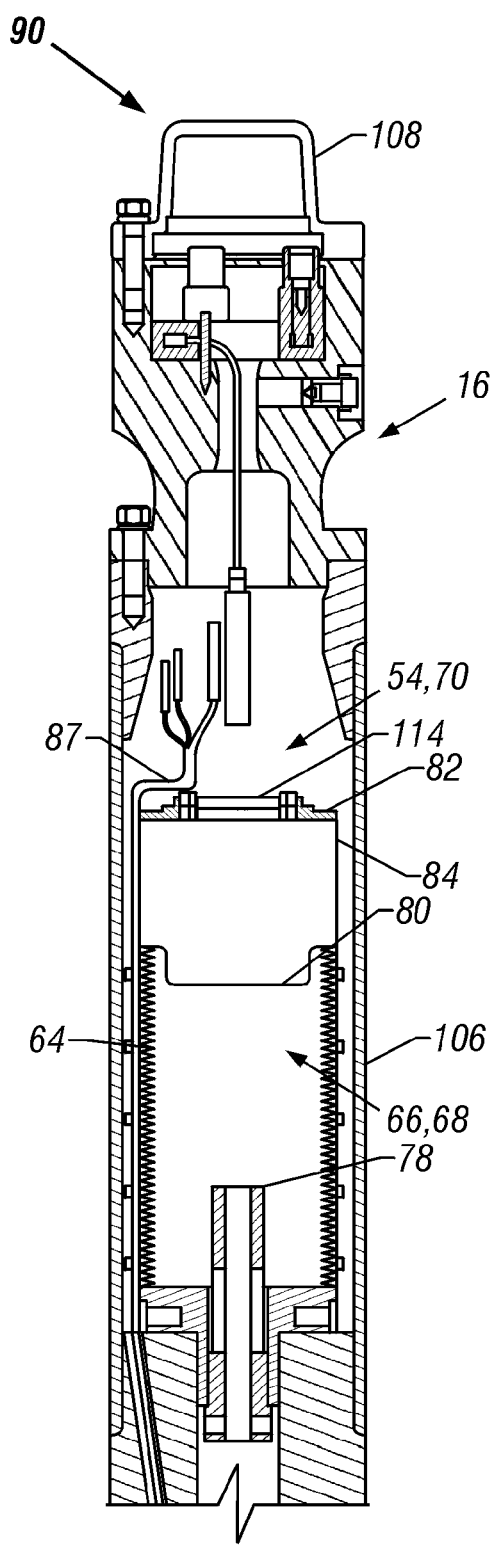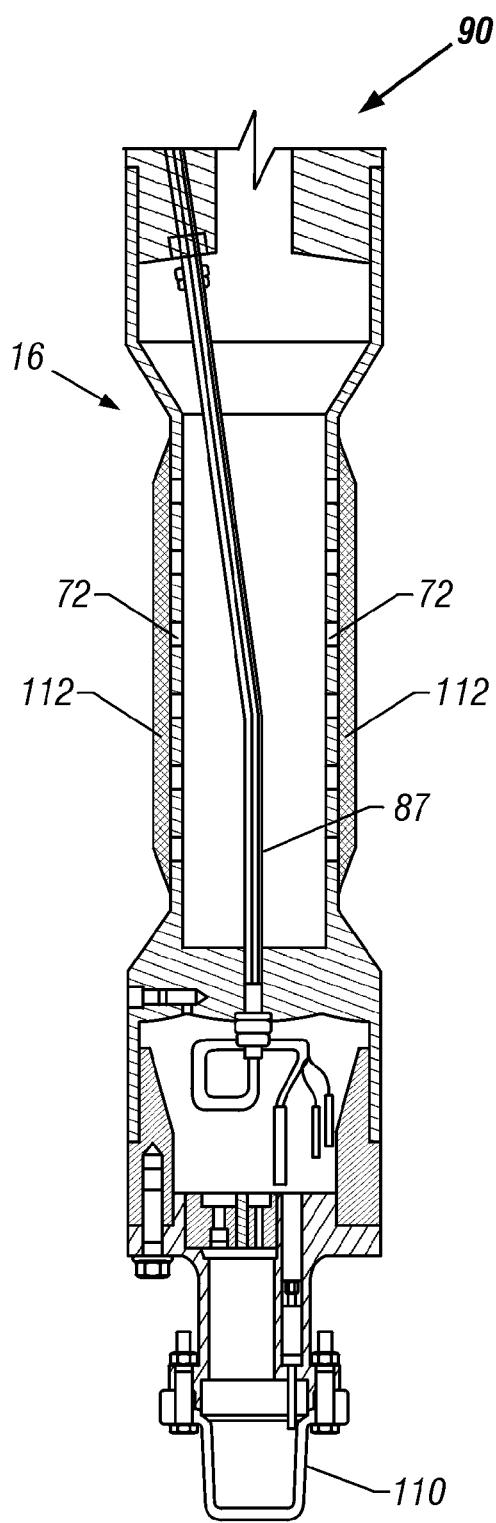
FIG. 5A
FIG. 5B

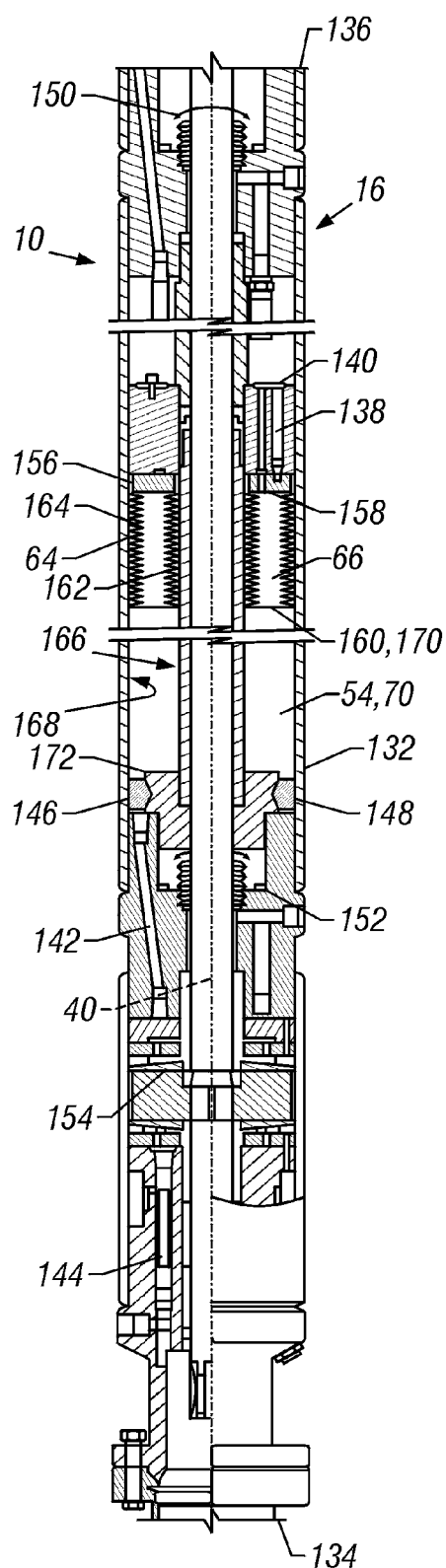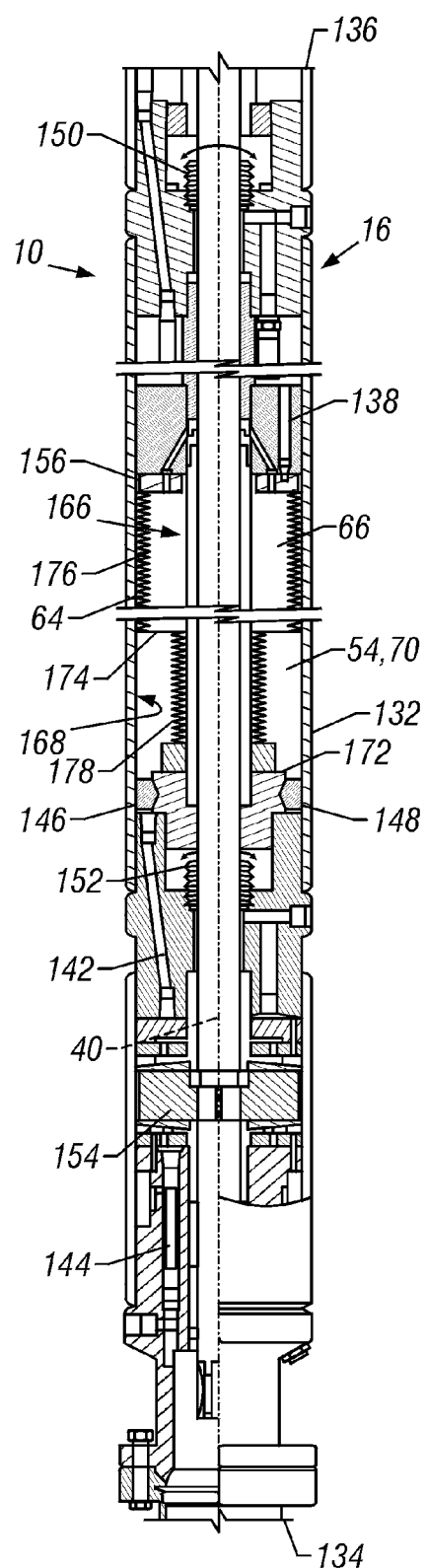
*FIG. 11*     *FIG. 12*

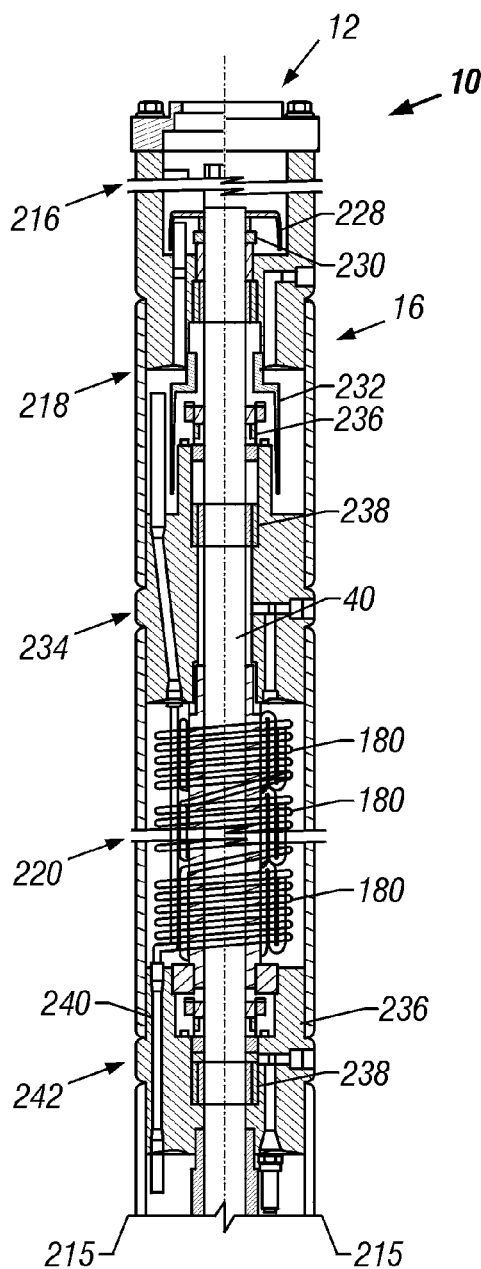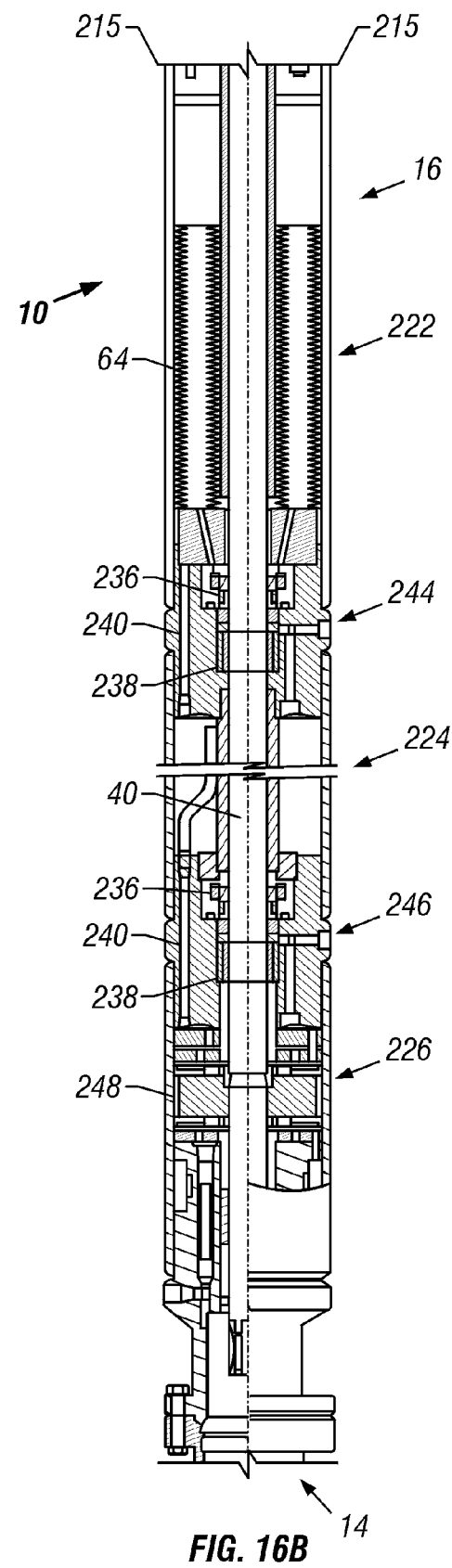
FIG. 16A
FIG. 16B

PROTECTOR FOR ELECTRICAL SUBMERSIBLE PUMPS

CROSS REFERENCE TO RELATED APPLICATIONS

This is a continuation of U.S. Ser. No. 10/907,976, filed Apr. 22, 2005, which is a continuation of U.S. Ser. No. 10/727,922, now U.S. Pat. No. 6,981,853 filed Dec. 4, 2003, which is a divisional of U.S. Ser. No. 10/059,795, now U.S. Pat. No. 6,688,860, filed Jan. 29, 2002, which claims the benefit under 35 C.S.C. 119(e) to U.S. Provisional Application No. 60/303,860 filed Jul. 9, 2001 and prior Provisional Application No. 60/299,013 filed Jun. 18, 2001.

FIELD OF THE INVENTION

The present invention relates generally to motor protectors for protecting submersible motors, such as those used in raising fluids from petroleum wells. More particularly, the present invention relates to a motor protection system and method comprising one or both of a protected bellows assembly and a three-dimensional labyrinth assembly.

BACKGROUND OF THE INVENTION

A variety of production fluids are pumped from subterranean environments. Different types of submersible pumping systems may be disposed in production fluid deposits at subterranean locations to pump the desired fluids to the surface of the earth.

For example, in producing petroleum and other useful fluids from production wells, it is generally known to provide a submersible pumping system for raising the fluids collected in a well. Production fluids, e.g. petroleum, enter a wellbore drilled adjacent a production formation. Fluids contained in the formation collect in the wellbore and are raised by the submersible pumping system to a collection point at or above the surface of the earth.

A typical submersible pumping system comprises several components, such as a submersible electric motor that supplies energy to a submersible pump. The system further may comprise a variety of additional components, such as a connector used to connect the submersible pumping system to a deployment system. Conventional deployment systems include production tubing, cable and coiled tubing. Additionally, power is supplied to the submersible electric motor via a power cable that runs through or along the deployment system.

Often, the subterranean environment (specifically the well fluid) and fluids that are injected from the surface into the wellbore (such as acid treatments) contain corrosive compounds that may include $CO_2$, $H_2S$ and brine water. These corrosive agents can be detrimental to components of the submersible pumping system, particularly to internal electric motor components, such as copper windings and bronze bearings. Moreover, irrespective of whether or not the fluid is corrosive, if the fluid enters the motor and mixes with the motor oil, the fluid can degrade the dielectric properties of the motor oil and the insulating materials of the motor components. Accordingly, it is highly desirable to keep these external fluids out of the internal motor fluid and components of the motor.

Submersible electric motors are difficult to protect from corrosive agents and external fluids because of their design requirements that allow use in the subterranean environment. A typical submersible motor is internally filled with a fluid, such as a dielectric oil, that facilitates cooling and lubrication of the motor during operation. As the motor operates, however, heat is generated, which, in turn, heats the internal motor fluid causing expansion of the oil. Conversely, the motor cools and the motor fluid contracts when the submersible pumping system is not being used.

In many applications, submersible electric motors are subject to considerable temperature variations due to the subterranean environment, injected fluids, and other internal and external factors. These temperature variations may cause undesirable fluid expansion and contraction and damage to the motor components. For example, the high temperatures common to subterranean environments may cause the motor fluid to expand excessively and cause leakage and other mechanical damage to the motor components. These high temperatures also may destroy or weaken the seals, insulating materials, and other components of the submersible pumping system. Similarly, undesirable fluid expansion and motor damage can also result from the injection of high-temperature fluids, such as steam, into the submersible pumping system.

Accordingly, this type of submersible motor benefits from a motor fluid expansion system able to accommodate the expanding and contracting motor fluid. The internal pressure of the motor must be allowed to equalize or at least substantially equalize with the surrounding pressure found within the wellbore. As a result, it becomes difficult to prevent the ingress of external fluids into the motor fluid and internal motor components.

Numerous types of motor protectors have been designed and used in isolating submersible motors while permitting expansion and contraction of the internal motor fluid. A variety of elastomeric bladders alone or in combination with labyrinth sections have been used as a barrier between the well fluid and the motor fluid. For example, expandable elastomeric bags or bladders have been used in series to prevent mixing of wellbore fluid with motor fluid while permitting expansion and contraction of the motor fluid.

In this latter design, the motor protector includes a pair of chambers each of which have an elastomeric bladder. The first bladder is disposed in a first chamber of the pair of chambers and includes an interior in fluid communication with the motor. This fluid communication permits motor oil to flow from the motor into the elastomeric bladder during expansion and to flow from the elastomeric bladder back to the motor during contraction.

The second chamber also has an expandable bladder, filled with motor oil, which is in fluid communication with the first chamber but external to the first elastomeric bladder. The second chamber is vented or open to the wellbore environment. This assembly permits fluid to flow between the second elastomeric bladder and the adjacent chamber as the first elastomeric bladder expands or contracts. Simultaneously, wellbore fluid is allowed to flow in and out of the second chamber, external to the second elastomeric bladder, to permit equalization of pressure as the second bladder expands and contracts.

This type of expansion chamber works well in many environments, but certain of the corrosive agents found in at least some wellbore environments comprise corrosive gases that permeate the elastomeric bags or bladders. These corrosive agents eventually can work their way into the motor oil within the first elastomeric bladder and ultimately corrode and damage internal components of the electric motor. The wellbore environment also may have an undesirable temperature (e.g., hot), which may destroy the elastomeric bag or bladder and the shaft seal materials throughout the submersible pumping system.

The conventional labyrinth type protector uses the difference in specific gravity of the well fluid and the motor fluid to separate the fluids. For example, a typical labyrinth may embody a chamber having a first passageway to the motor fluid and a second passageway to an undesirable fluid, such as fluids in the wellbore. The first and second passageways are generally oriented on opposite sides of the chamber to maintain fluid separation in a vertical orientation. Accordingly, conventional labyrinth type protectors are generally less effective, or totally useless, in orientations deviated from the vertical orientation.

Accordingly, the need exists for improved motor protectors, which are operable in variable temperature applications and multiple orientations. For example, it would be advantageous to position a bellows assembly between a motor fluid and an external fluid and positively pressurize the motor fluid relative to the external fluid to prevent inward leakage of the external fluid into the motor. It also would be advantageous to provide a relatively balanced bellows assembly having one or both ends fixed, rather than using sliding seals. Moreover, it would be advantageous to provide a multi-orientable labyrinth having conduits extending in multiple orientations to maintain fluid paths having peaks and valleys in all potential orientations.

SUMMARY OF THE INVENTION

The present invention features a system and method for protecting a motor of a submersible pumping system. A variety of motor protector features are provided to facilitate operation of the motor protector and submersible pumping system in multiple wellbore environments and applications.

BRIEF DESCRIPTION OF THE DRAWINGS

The invention will hereafter be described with reference to the accompanying drawings, wherein like reference numerals denote like elements, and:

FIG. 2 is a diagrammatical cross-section of the pumping system having a bellows assembly to separate well fluid from motor fluid, which is positively pressurized within the motor housing;

FIG. 3 is a front elevational view of an exemplary configuration of the pumping system having a seal section and bellows section disposed about the submersible motor;

FIGS. 5A and 5B are cross-sectional views of the bellows section;

FIGS. 11 and 12 are cross-sectional views of alternate embodiments of a bellows section;

FIGS. 16A and 16B are cross-sectional views of the pumping system illustrating an alternate embodiment having both the bellows assembly and the multi-orientable labyrinth assembly.

DETAILED DESCRIPTION

Figure 1:
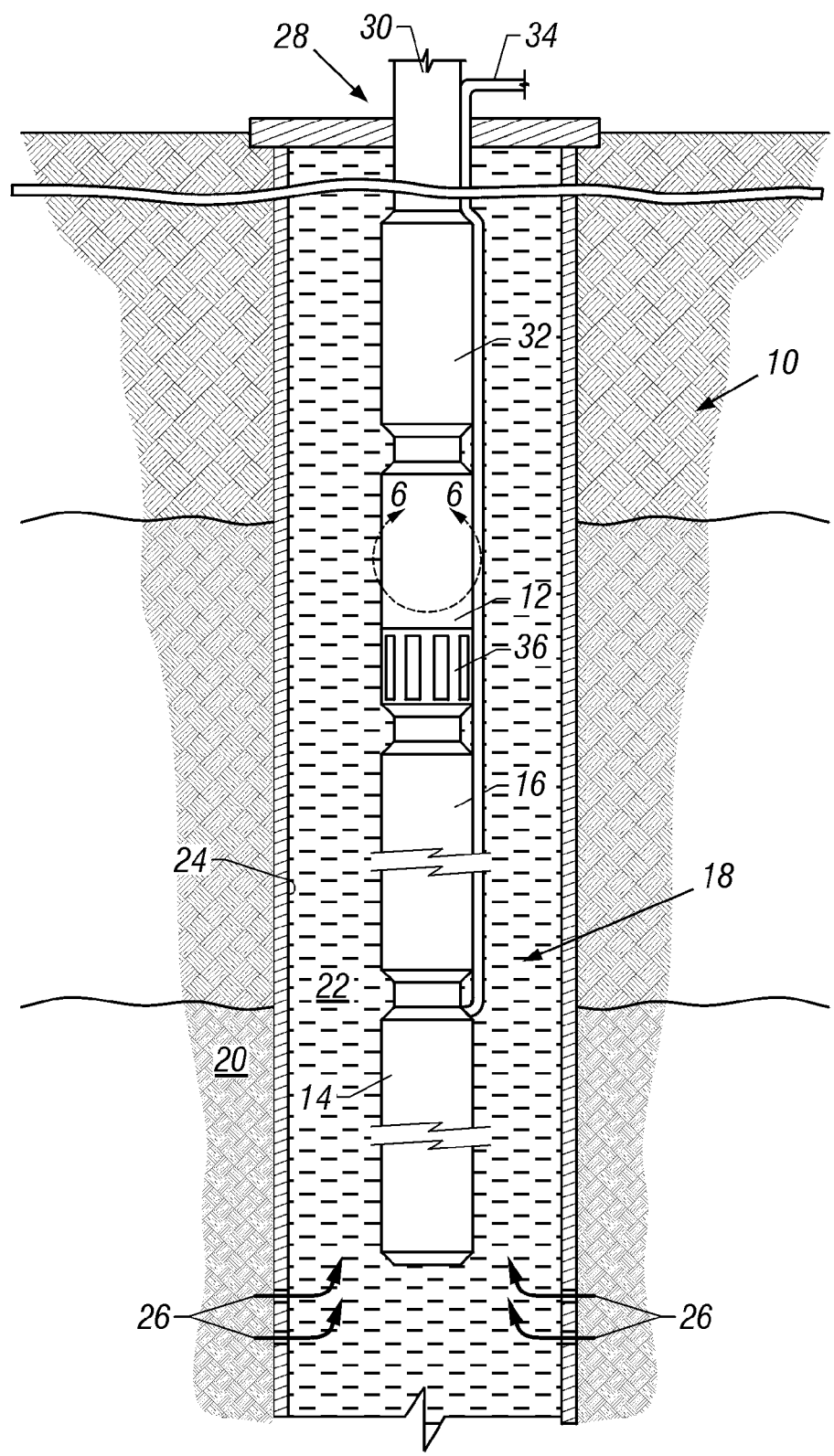
FIG. 1 is a front elevational view of an exemplary pumping system disposed within a wellbore.

Referring generally to FIG. 1, an exemplary pumping system 10, such as a submersible pumping system, is illustrated. Pumping system 10 may comprise a variety of components depending on the particular application or environment in which it is used. Typically, system 10 has at least a submersible pump 12, a motor 14 and a motor protector 16. Motor 14 may comprise any electric motor or other motor that requires volume compensation based on, for instance, the thermal expansion and/or contraction of internal fluid. The submersible pump 12 may be of a variety of types, e.g. a centrifugal pump, an axial flow pump, or a mixture thereof. The system 10 may also comprise a gearbox, as is known in the art.

In the illustrated example, pumping system 10 is designed for deployment in a well 18 within a geological formation 20 containing desirable production fluids, such as petroleum. In a typical application, a wellbore 22 is drilled and lined with a wellbore casing 24. Wellbore casing 24 typically has a plurality of openings 26, e.g. perforations, through which production fluids may flow into wellbore 22.

Pumping system 10 is deployed in wellbore 22 by a deployment system 28 that may have a variety of forms and configurations. For example, deployment system may comprise tubing 30 connected to pump 12 by a connector 32. Power is provided to submersible motor 14 via a power cable 34. Motor 14, in turn, powers centrifugal pump 12, which draws production fluid in through a pump intake 36 and pumps the production fluid to the surface via tubing 30.

It should be noted that the illustrated submersible pumping system 10 is merely an exemplary embodiment. Other components can be added to the system, and other deployment systems may be implemented. Additionally, the production fluids may be pumped to the surface through tubing 30 or through the annulus formed between deployment system 28 and wellbore casing 24. In any of these configurations of submersible pumping system 10, it is desirable to attain maximum protection and life of the motor fluid, the motor 14 and the motor protector 16 in accordance with the present invention.

In the present invention, the system 10 may have multiple sections of the motor protector 16 disposed about the motor 14. A diagrammatical cross-sectional view of an exemplary embodiment of the system 10 is provided in FIG. 2. As illustrated, the system 10 comprises the pump 12, motor 14, and various motor protection components disposed in a housing 38. The pump 12 is rotatably coupled to the motor 14 via a shaft 40, which extends lengthwise through the housing 38 (e.g., one or more housing sections coupled together). The system 10 and the shaft 40 may have multiple sections, which can be intercoupled via couplings and flanges. For example, the shaft 40 has couplings 42 and 44 and an intermediate shaft section 46 disposed between the pump 12 and the motor 14. Various sections and configurations are illustrated in detail below, with reference to FIGS. 2-3, 6-13, 16 and 17.

A variety of seals, filters, absorbent assemblies and other protection elements also may be disposed in the housing 38 to protect the motor 14. A thrust bearing 48 is disposed about the shaft 40 to accommodate and support the thrust load from the pump 12. A plurality of shaft seals, such as shaft seals 50 and 52, are also disposed about the shaft 40 between the pump 12 and the motor 14 to isolate a motor fluid 54 in the motor 14 from external fluids, such as well fluids and particulates. The shaft seals 50 and 52 also may include stationary and rotational components, which may be disposed about the shaft 40 in a variety of configurations. The system 10 also has a plurality of moisture absorbent assemblies, such as moisture absorbent assemblies 56, 58, and 60, disposed throughout the housing 38 between the pump 12 and the motor 14. These moisture absorbent assemblies 56-60 absorb and isolate undesirable fluids (e.g., water, H2S, etc.) that have entered or may enter the housing 38 through the shaft seals 50 and 52 or though other locations. For example, the moisture absorbent assemblies 56 and 58 are disposed about the shaft 40 at a location between the pump 12 and the motor 14, while the moisture absorbent assembly 60 is disposed on an opposite side of the motor 14 adjacent a bellows assembly 64. In addition, the actual protector section above the motor may include a hard bearing head with shedder (see FIG. 10).

Figure 9:
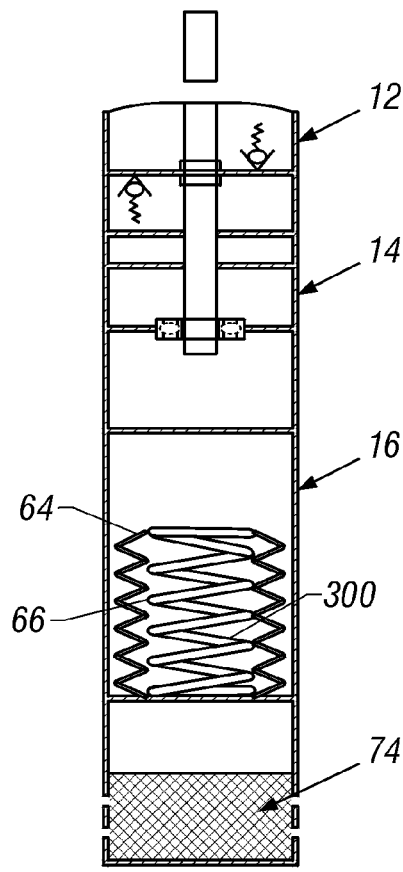
FIG. 9 is a diagrammatical cross-section of the pumping system having a bellows assembly with a spring assembly.
Figure 10:
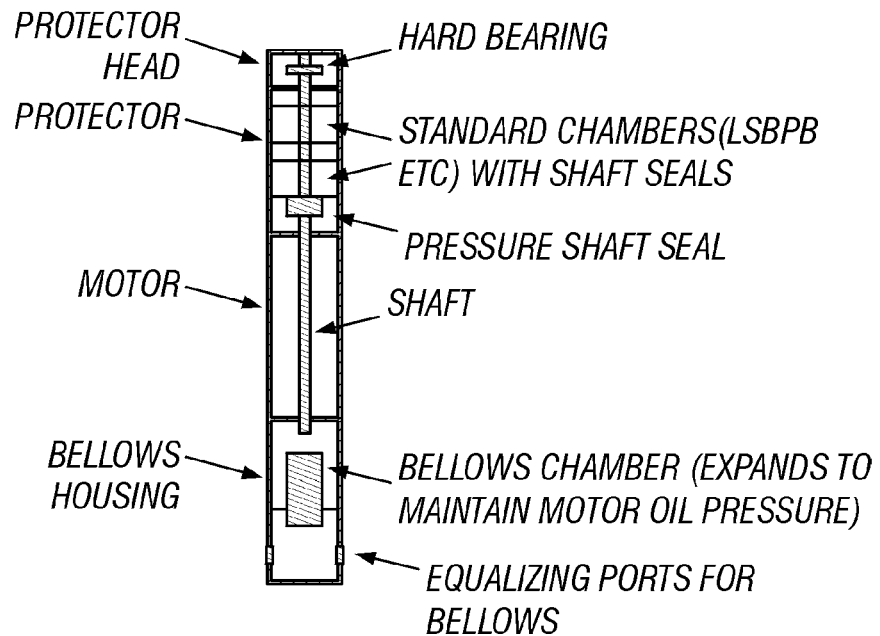
FIG. 10 is a diagrammatical cross-section of the pumping system having a bellows assembly and a hard bearing.

As illustrated in FIG. 2, the motor fluid 54 is in fluid communication with an interior 66 of the bellows assembly 64, while well fluid 68 is in fluid communication with an exterior 70 of the bellows assembly 64. Accordingly, the bellows assembly 64 seals the motor fluid 54 from the well fluid 68, while positively pressurizing the motor fluid 54 relative to the well fluid 68 (e.g., a 50 psi pressure differential). The spring force, or resistance, of the bellows assembly 64 ensures that the motor fluid 54 maintains a higher pressure than that of the well fluid 68. A separate spring assembly or biasing structure (e.g., as illustrated by FIG. 9 generally) also may be incorporated in bellows assembly 64 to add to the spring force, or resistance, which ensures that the motor fluid 54 maintains a higher pressure than that of the well fluid 68.

The bellows assembly 64 may embody a variety of structural features, geometries and materials. For example, the bellows assembly 64 may embody an enclosure having an annular wall formed by a plurality of symmetrical wall sections, such as ring-shaped wall sections, which are foldingly collapsible and expandable with fluid pressure variations in the system (e.g., an accordion-like enclosure). As illustrated by FIGS. 2, 5A-B, 6, 10 and 17, the bellows assembly 64 provides a direct separation interface between the motor and well fluids 54 and 68 and uses the pressure of the well fluid 68 in combination with a spring force of the bellows assembly 64 to positively pressurize the motor fluid 54.

The bellows assembly 64 also may be used for pressure balancing or equalization between the motor and well fluids 54 and 68 or between the motor fluid 54 and another internal fluid of the system 10, such as illustrated in FIGS. 11, 12 and 16B. In this pressure balancing embodiment of the bellows assembly 64, the bellows assembly 64 may embody one or more collapsible wall sections of varying cross-sections, such as annular wall sections having different diameters. As illustrated by FIGS. 11, 12 and 16B, the foregoing annular wall sections may be disposed about a motor-to-pump shaft between the pump 12 and the motor 14 for internal pressure balancing of the motor and well fluids 54 and 68. However, it is understood that these bellows assemblies 64 also may provide some positive pressurization (e.g., 5 psi) of the motor fluid 54 relative to the well fluid 68. As illustrated in FIG. 11, the bellows assembly 64 may have concentric collapsible walls, which form a hollow ring-shaped enclosure. As illustrated in FIG. 12, the foregoing collapsible walls of the bellows assembly 64 may be disposed in a stepped configuration, which has a disk-shaped wall coupling adjacent collapsible walls. In any of the foregoing structures and configurations, the bellows assembly 64 may be coupled to the submersible pumping system at one or both ends without a sliding seat.

In any of the foregoing positive pressurization or pressure balancing configurations, the bellows assembly 64 may be constructed from suitable materials that are resistant (e.g., impermeable) to the hot and corrosive environment within the wellbore, such as Kalrez, Chemrez, or Inconel 625. Accordingly, the bellows assembly 64 provides a relatively strong fluid separation between the motor and well fluids (or other internal fluid of the system 10) to prevent leakage into the motor 14, to prevent undesirable contamination and corrosion of the motor 14, and to prolong life of the motor 14 and the overall system 10.

Initially, the motor fluid 54 is injected into the motor 14 and the bellows assembly 64 is pressurized until a desired positive pressure is obtained within the motor 14. For example, the system 10 may set an initial pressure, such as 25-100 psi, prior to submerging the system 10 into the well. The exterior chamber 70 adjacent the bellows assembly 64 also may be filled with fluid prior to submerging the system into the well. The well fluid 68 enters the housing 38 through ports 72 and mixes with this fluid in exterior chamber 70 as the system 10 is submersed into the well.

Referring now to the operation of the bellows assembly 64 illustrated by FIG. 2, the motor fluid 54 expands and contracts as the motor 14 is activated and deactivated and as other temperature fluctuations affect the fluid volume. If the motor fluid 54 expands, then the bellows assembly 64 expands accordingly. If the motor fluid 54 contracts, then the bellows assembly 64 also contracts. The spring force of the bellows assembly 64 ensures that the motor fluid 54 is positively pressurized relative to the well fluid 68, regardless of whether the motor fluid 54 has expanded or contracted (e.g., 10 psi, 25 psi, 50 psi or higher pressure differential).

During or after submerging the system 10, the system 10 may release or inject oil in the motor to maintain the pressure of the motor fluid 54 within a certain pressure range. Accordingly, as illustrated by the bellows configuration of FIGS. 2, 5A-B, 6, 10 and 17, the external fluids (i.e., the well fluid 68) are continuously pressured away from the internal fluids (i.e., the motor fluid 54) of the motor 14 to prevent undesirable corruption of the internal fluids and components of the motor 14. The foregoing pressure ensures that if leakage occurs, the leakage is directed outwardly from the motor fluid 54 to the well fluid 68, rather than inwardly from the well fluid 68 into the motor fluid 54 (i.e., the typical undesirable leakage/corruption of the motor fluid 54). The positive internal pressure generally provides a better environment for the system 10. The positive pressure of the motor fluid 54 provided by the bellows assembly 64 also may be used to periodically flush fluids through the bearings and seals to ensure that the bearings and seals are clean and operable.

Throughout the life of the system 10, motor fluid 54 tends to leak outwardly through the shaft seals (such as shaft seals 50 and 52) and into the external fluids. By itself, this gradual leakage tends to decrease the pressure of the motor fluid 54. However, the bellows assembly 64 compensates for the leakage to maintain a certain positive pressure range within motor fluid 54. In the embodiment shown in FIG. 2, the bellows assembly 64 compensates by contracting (due to the spring force). In the embodiment shown in FIGS. 5A-5B (described below), the bellows assembly 64 compensates by expanding (also due to the spring force).

The bellows assembly 64 also may have various protection elements to extend its life and to ensure continuous protection of the motor 14. For example, a filter 74 may be disposed between the ports 72 and the exterior 70 of the bellows assembly 64 to filter out undesirable fluid elements and particulates in the well fluid 68 prior to fluid communication with the exterior 70. A filter 76 also may be provided adjacent the interior 66 of the bellow assembly 64 to filter out motor shavings and particulates. As illustrated, the filter 76 is positioned adjacent the moisture absorbent assembly 60 between the motor cavity 62 and the interior 66 of the bellows assembly 64. Accordingly, the filter 76 prevents solids from entering or otherwise interfering with the bellows assembly 64, thereby ensuring that the bellows assembly 64 is able to expand and contract along with volume variations in the fluids.

A plurality of expansion and contraction stops also may be disposed about the bellows assembly 64 to prevent over and under extension and to prolong the life of the bellows assembly 64. For example, a contraction stop 78 may be disposed within the interior 66 of the bellows assembly 64 to contact an end section 80 and limit contraction of the bellows assembly 64. An expansion stop 82 also may be provided at the exterior 70 of the bellows assembly 64 to contact the end section 80 and limit expansion of the bellows assembly. These contraction and expansion stops 78 and 82 can have various configurations depending on the material utilized for the bellows assembly 64 and also depending on the pressures of the motor fluid 54 and the well fluid 68. A housing 84 also may be disposed about the exterior 70 to guide the bellows assembly 64 during contraction and expansion and to provide overall protection about the exterior 70.

As discussed above, the motor fluid 54 may be pressurized significantly prior to submersing the system 10. As the system 10 is submersed and activated in the downhole environment, the internal pressure of the motor fluid 54 may rise and/or fall due to temperature changes, such as those provided by the activation and deactivation of the motor 14. Accordingly, various valves may be disposed within the housing 38 to control the pressurization of the motor fluid 54 and to maintain a suitable positive pressure range for the motor fluid 54. For example, a valve 86 may be provided to release motor fluid 54 when the pressurization exceeds a maximum pressure threshold. In addition, another valve may be provided to input additional motor fluid when the pressurization falls below a minimum pressure threshold. Accordingly, the valves maintain the desired pressurization and undesirable fluid elements are repelled from the motor cavity 62 at the shaft seals 50 and 52.

The system 10 also may have a wiring assembly 87 extending through the housing 38 to a component adjacent the bellows assembly 64. For example, a variety of monitoring components may be disposed below the bellows assembly 64 to improve the overall operation of the system 10. Exemplary monitoring components comprise temperature gauges, pressure gauges, and various other instruments, as should be appreciated by those skilled in the art.

As discussed above, the system 10 may have various configurations of the bellows assembly 64 and motor protection components for the motor 14. FIG. 3 is a front elevational view of an exemplary configuration of the system 10, wherein the motor protector 16 comprises a seal section 88 and a bellows section 90. As illustrated, the seal section 88 is disposed between the pump 12 and the motor 14, while the bellows section 90 is disposed adjacent the motor 14 on an opposite side of the seal section 88. The system 10 also has an optional monitoring system 92 disposed adjacent the bellows section 90. If additional sealing and motor protection is desired in the system 10, then a plurality of the seal and bellows sections 88 and 90 can be disposed about the motor 14 in desired locations. For example, the system 10 may have multiple bellows sections 90 disposed sequentially and/or on opposite sides of the motor 14 (see FIG. 17, which illustrates a bellows section 90 having two bellows assemblies 64 in series). Exemplary embodiments of the seal and bellows sections 88 and 90 are illustrated in FIGS. 4 and 5A-B, respectively.

Figure 4:
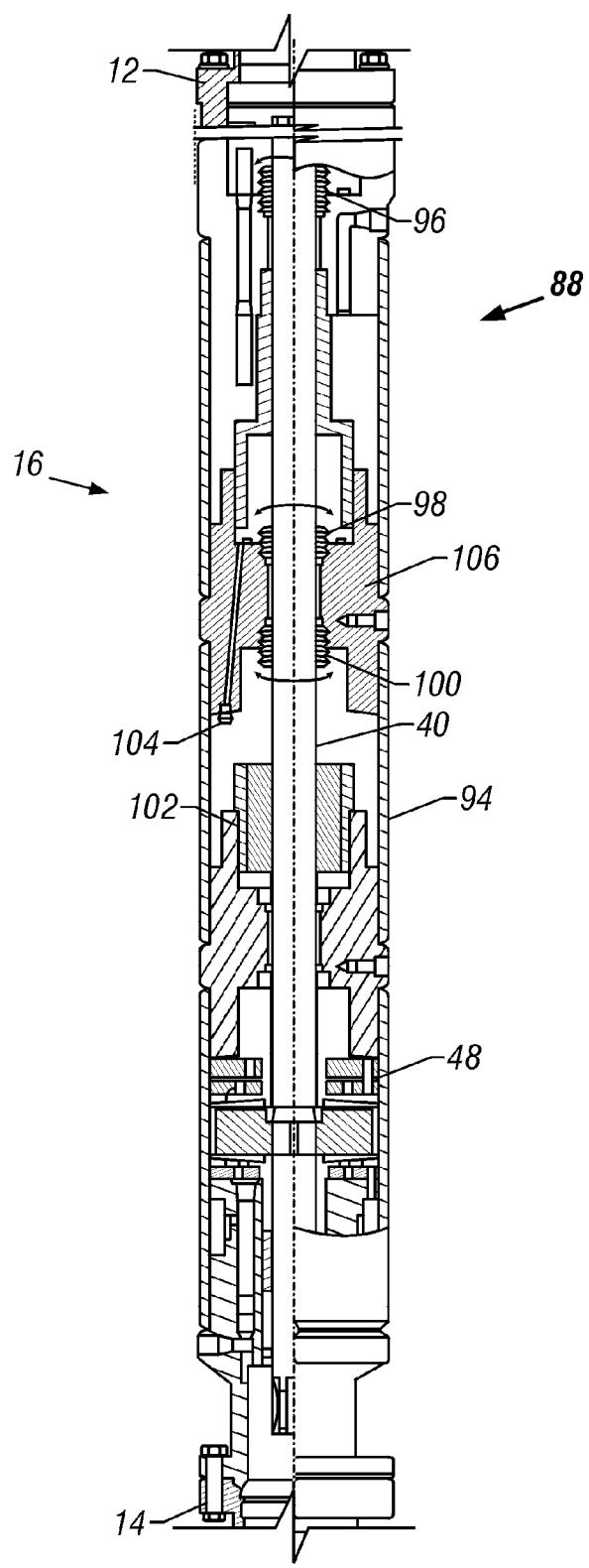
FIG. 4 is a cross-sectional view of the seal section.

As illustrated in FIG. 4, the seal section 88 of the motor protector 16 has various seal and protection elements disposed about the shaft 40 within a housing 94. These elements are provided to protect the motor 14 from undesirable fluid elements in the adjacent pump 12 and wellbore. Accordingly, the seal section 88 has a plurality of shaft seals, such as shaft seals 96, 98 and 100, disposed about the shaft 40 to seal and isolate the motor fluid 54 from the undesirable fluids (e.g., the well fluid 68). The seal section 88 also has the thrust bearing 48 disposed about the shaft 40 to accommodate and support the thrust load from the pump 12. A moisture absorbent assembly 102 also may be disposed about the shaft 40 to remove the undesirable fluids from the internal fluid (i.e., the motor fluid 54 within the housing 94).

As discussed above, the internal fluid of the system 10 is positively pressurized to prevent in-flow of the undesirable fluids through the shaft seals 96, 98, and 100. In a section 106 between the shaft seals 98 and 100, a relief valve 104 is provided to release internal fluid from the system 10 when the internal pressure exceeds the maximum pressure threshold. Accordingly, the present technique maintains the internal fluid within a certain positively pressurized pressure range to prevent in-flow of undesirable fluids through the shaft seals 96, 98, and 100, while also allowing a pressure release when the internal pressure exceeds the maximum pressure threshold. This technique ensures that fluid is pressurably repelled and ejected rather than allowing the undesirable fluids to slowly migrate into the system 10, such as in a pressure balanced system. However, the present invention also may utilize various pressure balancing assemblies to complement the seal and bellows sections 88 and 90, as discussed below with reference to FIGS. 6 and 13-16. For example, the seal section 88 may include a labyrinth or bag assembly between the shaft seals 96, 98 and 100 (see FIG. 6, which illustrates bag assembly 124 between shaft seals 116 and 118).

As illustrated in FIGS. 5A and 5B, the bellows section 90 of the motor protector 16 has the bellows assembly 64 disposed in a housing 106, which may be coupled to the motor 14 at a coupling section 108 and to another component at a coupling section 110. Inside the housing 106, the bellows assembly 64 is oriented such that the interior 66 is in fluid communication with the well fluid 68 through the ports 72. An external filter assembly 112 is disposed about the ports 72 to filter out undesirable elements within the well fluid 68. The exterior 70 of the bellows assembly 64 is in fluid communication with the motor fluid 54. The bellows assembly 64 also has a filter disposed between the bellows assembly 64 and the motor 14. For example, a filter assembly 114 may be disposed at the expansion stop 82 of the housing 84 to filter out motor shavings and other harmful elements. Accordingly, the filter assemblies 112 and 114 filter out undesirable elements from the motor fluid 54 and the well fluid 68 to protect the bellows assembly 64. In this configuration, the motor fluid 54 contracts the bellows assembly 64 as it is injected into the motor 14, while the well fluid 68 acts against the bellows assembly 64 as the system is submersed into the well.

As discussed above, the bellows assembly 64 is movably disposed within the housing 84 between the expansion stop 82 and the contraction stop 78. As the motor fluid 54 expands and contracts due to temperature changes, the bellows assembly 64 contracts or expands to a new resting position, where the internal motor pressure is balanced against the well pressure plus the spring force of the bellows. If the motor fluid 54 expands, the bellows of this embodiment contracts accordingly. If the motor fluid 54 contracts, the bellows of this embodiment expands accordingly. The motor fluid 54 in this embodiment, therefore, remains positively pressurized in relation to the well fluids 68, regardless of whether or not it has been expanded or contracted due to temperature variations.

The bellows assembly 64 also may utilize various spring assemblies and other biasing structures to facilitate pressurization of the motor fluid 54. For example, as shown in FIG. 9, a spring assembly 300 may be incorporated into the bellows assembly 64 to complement the resistance of the bellows assembly 64 and to increase the stroke of bellows assembly 64 (thereby increasing the time and range in which the bellows assembly 64 will maintain a positive pressure on motor fluid 54). As illustrated by the contrasting orientations of the bellows assembly 64 in FIGS. 2 and 5A-B, the orientation of the bellows assembly also can be varied to accommodate a particular pumping system and application.

Figure 17:
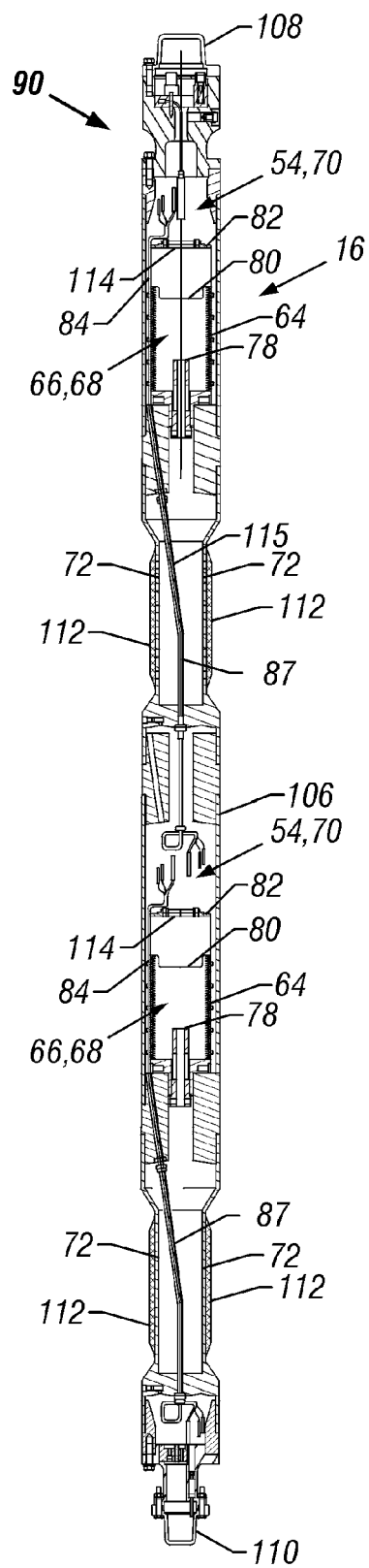
FIG. 17 is a cross-sectional view of an alternate bellows section having multiple bellows assemblies.

Moreover, as discussed in further detail below, the motor protector devices of the present technique may be used alone or separate, in duplicate, in series, in parallel, or in any suitable configuration to provide optimal protection for the motor 14. For example, as illustrated in FIG. 17, a plurality of bellows assemblies 64 may be disposed in series within the bellows section 90 of the system. In the embodiment of FIG. 17, the bellows section 90 comprises two of the motor protector structures illustrated by FIGS. 5A-5B. The bellows assemblies 64 are arranged longitudinally adjacent one another in the bellows section 90, each bellows assembly 64 having a longitudinally adjacent set of ports 72 and filters 12 for fluid communication with the well fluid 68. The opposite side of each bellows assembly 64 is in fluid communication with the motor fluid 54. The upper bellows assembly 64 is in direct fluid communication with the motor fluid 54 via the coupling 108. The lower bellows assembly 64 is in fluid communication with the motor fluid 54 through a conduit 115, which also may provide passage for the wiring assembly 87. Accordingly, the motor fluid 54 is positively pressurized relative to the well fluid 68 by the spring-force and well pressure exerted on both of the bellows assemblies 64. If additional internal pressure is needed to protect the motor fluid 54, then additional bellows assemblies 64 can be incorporated into the bellows section 90.

Figure 6:
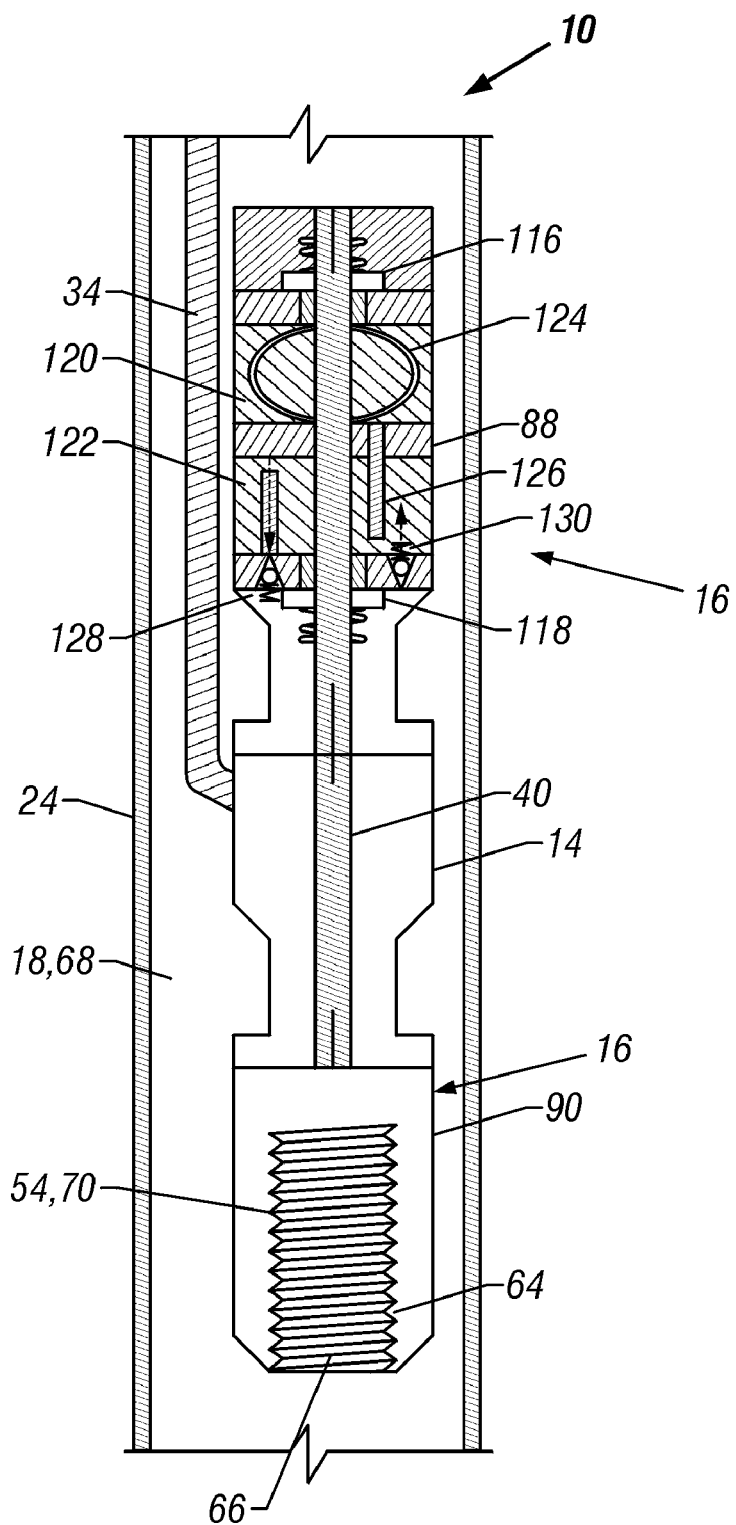
FIG. 6 is a diagrammatical cross-section of an alternate embodiment of the pumping system having multiple motor protection assemblies disposed about the submersible motor.

The system 10 also may comprise a variety of conventional motor protector components, such as a bag assembly and a labyrinth assembly. FIG. 6 is a diagrammatical cross-section of an alternate embodiment of the pumping system having such conventional motor protector elements. As illustrated, the system 10 has the pump 12, the seal section 88, the motor 14 and the bellows section 90 sequentially intercoupled.

The bellows section 90 has the bellows assembly 64 oriented such that the interior 66 is in fluid communication with the well fluid 68, while the exterior 70 is in fluid communication with the motor fluid 54. Although FIG. 6 does not illustrate the various filters and other protection elements for the bellows assembly 64, the bellows section 90 may include a variety of filters, seals, moisture absorbent assemblies, housings, bellow stops, and other desired bellows protection elements configured to prolong the life of the bellows assembly 64, as previously described.

The seal section 88 has shaft seals 116 and 118 disposed about chambers 120 and 122, which have a bag assembly 124 and a labyrinth assembly 126 disposed therein to provide pressure balancing between the shaft seals 116 and 118. The seal section 88 also may utilize a variety of other pressure balancing components, such as conventional bag assemblies, conventional labyrinth assemblies, and various bellows and labyrinth assemblies of the present technique. A plurality of pressure check valves, such as valves 128 and 130, are also disposed in the seal section 88 to control the positively pressurized fluid within the system 10. For example, the valve 128 is configured to monitor the pressure and to trigger a backup oil supply when the pressure falls below the minimum pressure threshold in the motor 14 (e.g., 5 psi). For example, if the bellows section 90 fails to expand or contracted as in normal operation, then the valve 128 acts as a backup to ensure a desired pressure range for the motor fluid 54. The valve 130 is configured to monitor the pressure and to release the positively pressurized motor fluid 54 within the motor 14 when the internal pressure exceeds the maximum pressure threshold. Accordingly, the valve 130 ensures that the O-ring seals in the pothead, the joints, and various other components in the seal section 88 are protected from excessive pressure differentials.

Figure 7:
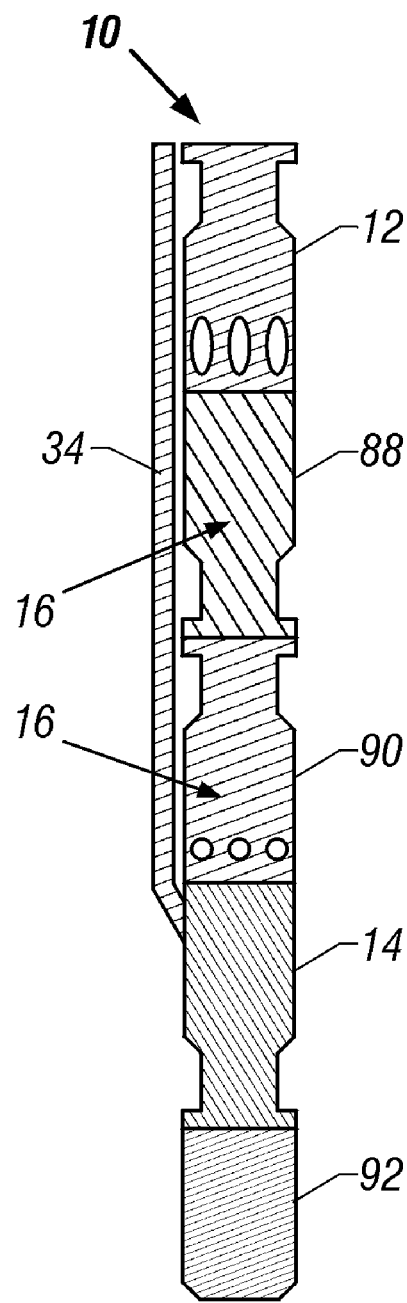
FIGS. 7 and 8 are front elevational views of alternate configurations of the pumping system.
Figure 8:
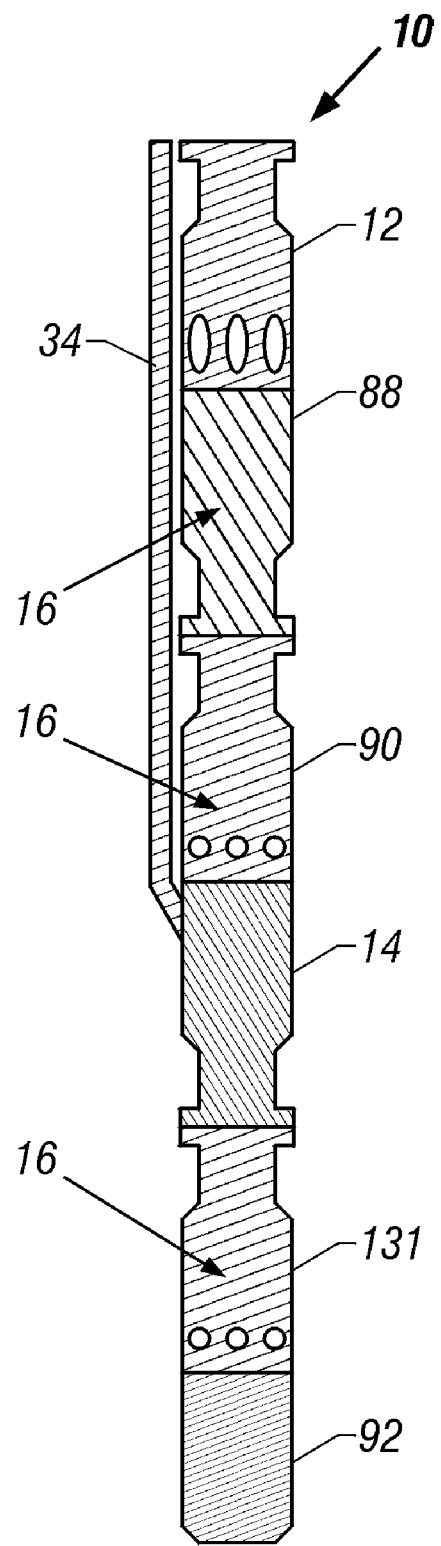

FIGS. 7 and 8 illustrate alternate configurations of the seal and bellow sections of the motor protector 16 of the system 10. As illustrated in FIG. 7, one embodiment of the system 10 has the seal section 88 and the bellows section 90 sequentially disposed between the pump 12 and the motor 14. The system 10 also has the optional monitoring system 92 disposed adjacent the motor 14 and opposite the bellows section 90. As illustrated in FIG. 8, the exemplary embodiment of system 10 also has the seal section 88 and the bellows section 90 sequentially disposed between the pump 12 and the motor 14. However, an additional bellows section 131 is disposed below the motor 14 to complement the bellows section 90 disposed above the motor 14. The system 10 also has the optional monitoring system 92 disposed below the relatively lower bellows section 131. Accordingly, the seal and bellows sections 88, 90 and 131 may be oriented at various locations relative to the pump 12 and the motor 14, while also including a plurality of such sections 88, 90 and 131 to improve the effectiveness of the overall motor protection technique. It also should be noted that the seal sections 88 illustrated in FIGS. 7 and 8 may include conventional motor protection components, such as those illustrated in FIG. 6.

It is expected that the bellows section, as discussed above and illustrated in FIGS. 5A-5B, may be reused in the system 10 with minimal repair costs. There is no shaft below the motor, so mechanical wear should be at a minimum, and the metal bellows will operate well down the stress strain curve, which should reduce fatigue and loss of spring constant force.

The system 10 also may have a variety of alternate configurations of the bellows assembly 64 for positioning the bellows about the shaft 40, as illustrated in FIGS. 11 and 12. For example, the bellows assembly 64 may embody an annular or ring-shaped enclosure, which may be fixed at one or both ends to provide a fixed seal and an expandable/contractible volume. Accordingly, the bellows assembly 64 avoids use of sliding seals, which typically cause leakage into the motor fluid. In this embodiment, the fluid pressures on opposite sides of the bellows assembly 64 may be relatively balanced rather than providing a significant pressure differential between the fluids. However, it is understood that a slight pressure differential, such as 5 psi, may be provided in this pressure-balanced configuration of the bellows assembly 64.

As illustrated in FIGS. 11 and 12, the bellows section 90 has the bellows assembly 64 disposed in a housing 132, which may be coupled to the motor 14 at one of sections 134 and 136. For example, in these exemplary embodiments, the motor 14 is coupled to section 134, while the pump 12 or another protector component (e.g., a bellows assembly, a bag assembly, a labyrinth assembly, etc.) is coupled to the section 136.

Inside the housing 132, the bellows assembly 64 is oriented such that the interior 66 is in fluid communication with the well fluid 68 through the port 138. Alternatively, if a labyrinth assembly, such as illustrated in FIGS. 13-16, is coupled to the section 136, then the interior 66 may be in fluid communication with a desired isolation fluid configured to facilitate separation from the well fluid 68 in the labyrinth assembly. In either configuration, a filter assembly 140 can be disposed adjacent the port 138 to filter out undesirable elements within the well fluid 68 or the desired isolation fluid.

The exterior 70 of the bellows assembly 64 is in fluid communication with the motor fluid 54 via the ports 142 and 144. Alternatively, the exterior 70 may be in fluid communication with a second isolation fluid for a second labyrinth assembly, a bag assembly, or any other desired fluid separation assembly. As described in detail above, the bellows assembly 64 also can include a variety of bellows protection elements, such as guides, seals, filters and absorbent packs (e.g., moisture absorbent packs 146 and 148). The bellows section 90 also may comprise one or more shaft seals, thrust bearings, and various other seals and bearings. For example, the bellows section 90 may have shaft seals 150 and 152 disposed about the shaft 40 on opposite sides of the bellows assembly 64. A thrust bearing 154 is also disposed about the shaft 40 adjacent the section 134.

As discussed above, the bellows assemblies 64 of FIGS. 11 and 12 are balanced pressure bellows rather than a positively pressurized bellows, which is illustrated by FIGS. 2, 5A-B, 6, and 9. In operation of the bellows assemblies illustrated by FIGS. 11 and 12, injection and expansion of the motor fluid 54 in the motor 14 (or other isolation fluid) and the exterior 70 causes the bellows assembly 64 to contract. In contrast, the pressure of the well fluid 68 (or other isolation fluid) causes the bellows assembly to expand. As the motor fluid 54 expands and contracts due to temperature changes, the bellows assembly 64 contracts or expands to a new resting position, where the internal motor pressure is balanced against the well pressure plus any resistance of the bellows. If the motor fluid 54 (or other isolation fluid) expands, the bellows of this embodiment contracts accordingly. If the motor fluid 54 (or other isolation fluid) contracts, the bellows of this embodiment expands accordingly. Accordingly, bellows assembly 64 substantially balances the pressures between the motor fluid 54 and the well fluid 68 under a wide range of operating conditions, which include both expansion and contraction of the motor fluid 54. If a positive pressure differential is desired in the bellows assemblies 64 of FIGS. 11 and 12, then a spring assembly, such as illustrated in FIG. 9, can be incorporated into the bellows assemblies 64 to prevent inward leakage of undesirable elements such as the well fluid 68.

As noted above, the bellows assemblies 64 of FIGS. 11 and 12 may be fixed at one or both ends. The embodiment illustrated in FIG. 11 has the bellows assembly 64 fixed to a member 156 at an end 158, while an opposite end 160 is free to expand and contract within the housing 132. As illustrated, the bellows assembly 64 has a generally annular or ring-shaped geometry, which has inner and outer wall sections 162 and 164 extending along inner and outer walls 166 and 168 of the bellows section 90 from the member 156 to an opposite wall section 170 at the end 160. Accordingly, the opposite wall section 170 foldingly moves inwardly and outwardly as the pressure changes between the motor and well fluids 54 and 68. The bellows assembly 64 also may include a stop, such as illustrated in FIGS. 5A and 5B, to prevent over extension of the bellows assembly 64. The internal components of the bellows section (e.g., component 172) also may act as a stop for the bellows assembly 64. The particular length and spring stiffness of the bellows assembly 64 may be configured for any desired operating conditions and well environments. Additional bellows assemblies 64 also may be incorporated into the bellows section 90 to provide additional protection for the motor 14.

As illustrated by FIG. 12, the bellows assembly 64 also may have one or more stepped sections, such as stepped section 174. The stepped section 174 provides a fluid interface to facilitate expansion and contraction of the bellows assembly 64. In this exemplary embodiment, the bellows assembly 64 is fixed at both ends to members 156 and 172, while the stepped section 174 is movable as the well and motor fluids 54 and 68 expand and contract in the interior 66 and exterior 70 of the bellows assembly 64, respectively. The stepped section 174 acts as a fluid interface between large diameter and small diameter bellows sections 176 and 178, which are configured to move along the outer and inner walls 168 and 166, respectively. The particular lengths and spring stiffness of the bellows sections 176 and 178 may be configured for any desired operating conditions and well environments. Additional bellows assemblies 64 also may be incorporated into the bellows section 90 to provide additional protection for the motor 14.

The system 10 also can include one or more labyrinth assemblies, bag or bladder assemblies, or other conventional motor protector assemblies to protect both the motor 14 and the bellows assembly 64. Moreover, the system 10 can comprise the positively pressured bellows assembly 64 shown in FIG. 2 (for example) along with the balanced pressure bellows assembly 64 shown in FIGS. 11, 12, and 16B.

Additionally, as illustrated in FIGS. 13-16, the motor protector 16 of the system 10 may comprise a multi-orientable labyrinth assembly 180 (i.e., operable in multiple orientations), which may be used atone or in combination with the bellows assembly 64 or other components. As discussed in detail below, the multi-orientable labyrinth assembly 180 has one or more conduits that extend in multiple directions to ensure fluid paths having peaks and valleys in multiple orientations of the multi-orientable labyrinth assembly 180. Accordingly, the peaks and valleys in these various orientations ensure continuous fluid separation in all orientations of the multi-orientable labyrinth assembly 180 based on differences in specific gravity. In the embodiment illustrated in FIG. 13, the system 10 has the multi-orientable labyrinth assembly 180 disposed between the pump 12 and the motor 14.

As described in other embodiments of the system 10, a variety of seals, couplings, bearings, filters, absorbents, and protection devices may be provided to protect and prolong the life of the motor 14. Accordingly, the system 10 may include couplings 182 and 184, a thrust bearing 186, and a solids processor 188. The exemplary solids processor 188 is disposed in a chamber 189 between the pump 12 and the motor protector 16 to prevent solids from entering the multi-orientable labyrinth assembly 180 and from generally corrupting the motor projection devices in the motor protector 16. As illustrated, the solids processor 188 includes a variety of solids separators, such as shedder 190 and shroud 194, which prevent solids from settling on and damaging bearings and seals such as shaft seal 192. The solids separator 190 throws or sheds solids outwardly from the shaft 40 and shaft seal 192. The shroud 194, which may embody an extended length shedder in a deviated orientation, also prevents solids from settling near the shaft 40 and damaging the shaft seal 192. The solids processor 188 also includes one or more flow ports 196 that allow solids to escape into the wellbore.

The multi-orientable labyrinth assembly 180 comprises a multi-directional winding of tubing, which is fluidly coupled to the motor and well fluids 54 and 68 (or other isolation fluids) at ends 198 and 200, respectively. As illustrated, the ends 198 and 200 are positioned in respective opposite ends 202 and 204 of the motor protector 16. The end 198 is coupled to a port 206 extending to the motor 14, while the end 200 is positioned openly within the motor protector 16. The end 200 also includes a filter 208 to prevent solids and other undesirable elements from entering the multi-orientable labyrinth assembly 180. The well fluid 68 enters the motor protector 16 via conduit 210, which extends from the chamber 189 to the end 202 of the motor protector 202. The conduit 210 also can include one or more filters, such as filter 212, to prevent the inflow of solids into the motor protector 16.

Figure 14:
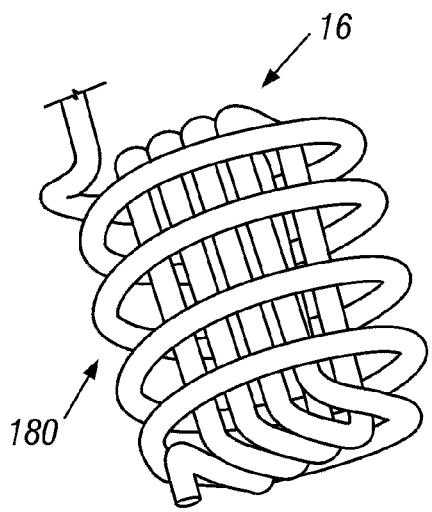
FIG. 14 is a perspective view of the multi-orientable labyrinth assembly, which is configured for disposal adjacent the bellows assembly such as illustrated in FIGS. 2 and 8.
Figure 15:
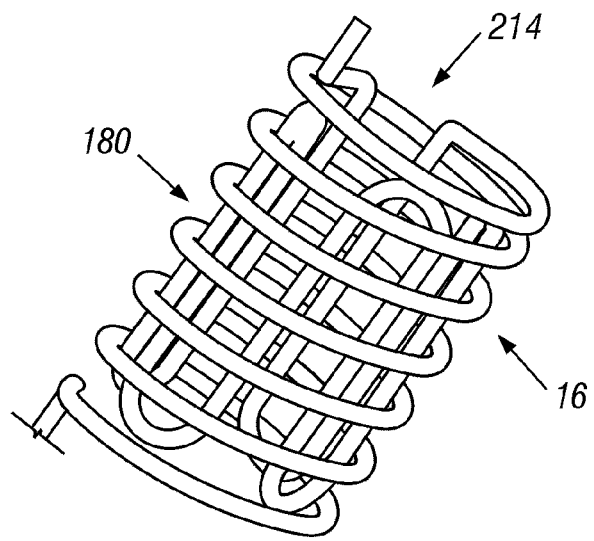
FIG. 15 is a perspective view of an alternate embodiment of the multi-orientable labyrinth assembly, which has a ring-shape configured to dispose the labyrinth assembly about the shaft as illustrated in FIG. 13.

In operation, the multi-directional winding of the multi-orientable labyrinth assembly 180 maintains fluid separation of the motor and well fluids 54 and 68 by using the differences in specific gravity of the fluids and multi-directional windings. As illustrated in FIGS. 14 and 15, the multi-orientable labyrinth assembly 180 has a plurality of crisscrossing and zigzagging tubing paths, which extend in multiple orientations (e.g., 2-D, 3-D, or any number of directions) to ensure that the fluids go through upward and downward movement regardless of the orientation of the system 10. For example, the multi-orientable labyrinth assembly 180 may be operable in a vertical wellbore, a horizontal wellbore, or any angled wellbore. The multi-orientable labyrinth assembly 180 also can be disposed in a variety of submersible pumping systems 10, including those illustrated in FIGS. 1-13 and 16. Moreover, a plurality of the multi-orientable labyrinth assemblies 180 may be disposed in series or in parallel in various locations within the system 10.

In one system configuration, such as illustrated by FIGS. 2, 5A-B, 6, 9 and 10, the embodiment illustrated in FIG. 14 may be disposed in a chamber between the bellows assembly 64 and the well fluid 68 to protect the bellows assembly 64. In the foregoing system configuration, the pump 12 and the motor 14 can be positioned side by side, while the bellows assembly 64 and the multi-orientable labyrinth assembly 180 are disposed adjacent the motor 14. In contrast, the embodiment illustrated in FIG. 15 is configured for positioning about the shaft 40 in a central protector configuration, such as illustrated by FIGS. 11-13 and 16. In this central configuration, the multi-orientable labyrinth assembly 180 has an annular or ring-shaped geometry, which provides an inner conduit 214 for the shaft 40. In both embodiments of FIGS. 14 and 15, the multi-orientable labyrinth assembly 180 may include one or more continuous tubes, which are interwoven in zigzagging and multi-directional patterns terminating at opposite ends of the labyrinth assembly 180. Moreover, the dimensions of the tubing, the density of the windings, and other geometrical features may be tailored to the specific system 10 and downhole environment.

The multi-orientable labyrinth assembly 180 also has an additional feature, as compared to conventional two-dimensional labyrinths. In two-dimensional labyrinths, the oil/well fluid interface occurs within the labyrinth chamber and not within one of the labyrinth tubes. In the multi-orientable labyrinth assembly 180, the interface may occur in the relevant chamber, but it may also occur within the multi-oriented tube 180 thereby enabling the assembly 180 to be used in any orientation (as previously discussed).

In an exemplary embodiment of the system 10, a plurality of the foregoing motor protector and seal devices may be disposed in parallel or in series within the system 10. FIGS. 16A and 16B, which are broken along line 215-215 for illustrative purposes, are cross-sectional views of an exemplary embodiment of the motor protector 16 having a plurality of motor protecting and sealing assemblies disposed between the pump 12 and the motor 14. As illustrated, the motor protector 16 includes a solids processing section 216 adjacent the pump 12, a sand shield or seal protection section 218 adjacent section 216, a multi-orientable labyrinth section 220 adjacent section 218, a bellows section 222 adjacent section 220, a conventional labyrinth section 224 adjacent section 222, and a thrust bearing section 226 adjacent section 224.

The solids processing section 216 can include a variety of shrouds to shield the seals, and various shedders and ports to shed and eject the solids into the wellbore, as discussed above. For example, the section 216 includes outer and inner shedders 228 and 230, respectively. The sand shield section 216 may comprise a variety of filters and shields, such as shroud 232, which prevent sand and other particulate matter from corrupting the system 10 (e.g., seal body 234).

Figure 13:
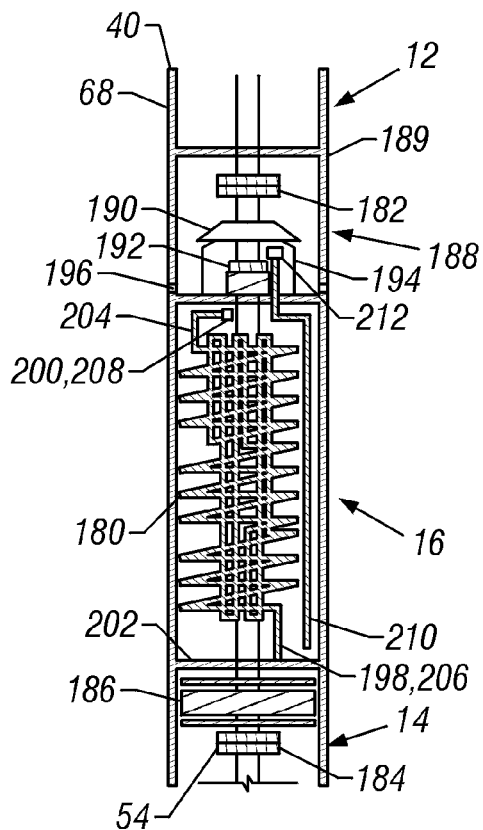
FIG. 13 is a diagrammatical cross-section of the pumping system having a multi-orientable labyrinth assembly.

The labyrinth section 220 comprises one or more of the multi-orientable labyrinth assemblies 180, such as illustrated in FIGS. 13 and 15, which may be coupled in series or in parallel within the section 220. The labyrinth section 220 also may comprise a conventional labyrinth or elastomeric bag assembly, such as illustrated in the labyrinth section 224 (see also FIG. 6, which illustrates conventional bag and labyrinth assemblies 124 and 130, respectively).

The bellows section 222 comprises one or more of the above-described bellows assemblies 64, which will typically be a balanced pressure bellows, but may also be a positively pressurized bellows. In the exemplary embodiment of FIGS. 16A and 16B, the bellows assembly 64 is a balanced pressure bellows, such as illustrated in FIGS. 11 and 12. Accordingly, the bellows assembly 64 is fixed at one or both ends of the bellows section 222.

The foregoing sections 218, 220, 222, 224 and 226 are intercoupled and sealed via seal bodies 234, 242, 244 and 246, each of which comprises a shaft seal 236, a bearing 238, and a conduit 240 for fluidly intercoupling the adjacent sections. The seal bodies 234, 242, 244 and 246 also can include a variety of other seals, bearings and conduits. The thrust bearing section 226 also comprises a thrust bearing 248 and other desired seals, bearings and conduit structures.

In addition to those components illustrated in FIGS. 16A and 16B, the system 10 may also comprise a positively pressured bellows assembly 64 located below the motor 14, as shown in FIGS. 2 and 6 for example.

Accordingly, the present invention may embody a variety of system configurations and motor protectors 16 and corresponding devices, such as the bellows assembly 64 and the multi-orientable labyrinth assembly 180. As described above, the bellows assembly 64 may embody either a positively pressurized system or a balanced pressure system. The foregoing motor protectors 16 and corresponding devices may be used alone or together in any configuration, including multiples of each device and conventional motor protectors. Moreover, one or more of the motor protectors 16 can be disposed above, between or below the pump 12 and the motor 14. For example, if a balanced pressure bellows is disposed above the motor 14 or between the pump 12 and the motor 14, then a positively pressurized bellows may be disposed below the motor 14 in fluid communication with the well fluid. Moreover, any of the foregoing motor protectors 16 and corresponding devices may be functionally combined in series or in parallel, or any combination thereof.

It will be understood that the foregoing description is of preferred exemplary embodiments of this invention, and that the invention is not limited to the specific forms shown. These and other modifications may be made in the design and arrangement of the elements without departing from the scope of the invention as expressed in the appended claims. For example, the bellows assembly may be replaced or complemented by any suitable pressure inducing assembly, such as a hydraulic piston assembly or a spring-assisted piston assembly.

What is claimed is:

1. A motor protector for a submersible pumping system, comprising:
    a housing positioned between a submersible centrifugal pump and a submersible motor to form an electric submersible pumping system;
    a bellows assembly within the housing, the bellows assembly having a first and a second accordion-like enclosure each able to expand and contract while isolating an internal motor oil, the first accordion-like enclosure being of a different diameter than the second accordion-like enclosure; and
    an attachment structure connecting at least one end of the bellows assembly to the electric submersible pumping system.

2. The motor protector of claim 1, further comprising a spring member positioned to pressurize the internal motor fluid to a positive pressure relative to an external well fluid pressure.

3. The motor protector of claim 1, wherein the bellows assembly is free of sliding seals.

4. The motor protector of claim 1, further comprising a filter positioned to limit movement of particulates into the bellows assembly.

5. The motor protector of claim 1, further comprising at least one stop to limit movement of at least one of the first and the second accordion-like bellows.

6. The motor protector of claim 5, wherein the at least one stop comprises a bellows contraction stop.

7. The motor protector of claim 5, wherein the at least one stop comprises a bellows expansion stop.

8. The motor protector of claim 2, wherein in the spring member is incorporated into at least one of the first and the second accordion-like bellows.

9. A method of protecting a motor in a submersible pumping system, comprising:
    providing a bellows assembly having accordion-like enclosures of different diameters;
    positioning the bellows assembly within a motor protector housing to form a motor protector able to isolate an internal motor dielectric oil;
    connecting the motor protector to a submersible motor to enable flow of the internal motor dielectric oil between the bellows assembly and the submersible motor; and
    operatively coupling a submersible centrifugal pump to the submersible motor on an opposite side of the motor protector.

10. The motor protector of claim 9, further comprising pressurizing the internal motor dielectric oil to a positive pressure relative to an external well fluid.

11. The motor protector of claim 9, further comprising forming an axial passage through the bellows assembly; and positioning a drive shaft through the axial passage.

12. The motor protector of claim 9, further comprising securing the bellows assembly in the motor protector housing without sliding seals.

13. The motor protector of claim 9, further comprising filtering the internal motor fluid to prevent contaminants from entering the bellows assembly.

14. The motor protector of claim 9, further comprising positioning stops within the motor protector housing to limit movement of the bellows assembly.

* * * * *